Jan. 24, 1961 R. GSTALDER ET AL 2,969,086
DEVICE FOR MEASURING AND BALANCING AIR
PRESSURE IN WHEEL TIRES OF AUTOMOBILES
Filed Sept. 2, 1958

INVENTORS
RAYMOND GSTALDER
GEORGES MATTEI
BY
Irwin S. Thompson
ATTY.

2,969,086
Patented Jan. 24, 1961

2,969,086
DEVICE FOR MEASURING AND BALANCING AIR PRESSURE IN WHEEL TIRES OF AUTOMOBILES

Raymond Gstalder, 11bis Blvd. Rainier III, Monaco, and Georges Mattei, 15 Rue des Roses, Monte-Carlo, Monaco Filed Sept. 2, 1958, Ser. No. 758,327

Claims priority, application France Sept. 5, 1957

6 Claims. (Cl. 137—557)

It is known that in order to preserve good road behavior of an automobile, it is recommended that the air pressures prevailing in the road wheel tires should remain constantly equal in the front wheels and in the rear wheels. The need of equal pressures in front wheel tires is particularly important. It is also known that numerous accidents due to skidding or side slipping particularly on wet roads are due to a defective adhesion by reason of a pressure difference between the front wheel tires. This pressure difference is the cause of a discrepancy between the braking stresses and increases the risk of skidding.

It is an object of the invention to provide a novel or improved device utilizable very handily for inflating wheel tires and verifying their inner pressure, said device being so conceived as to permit two wheel tires, namely the two front wheel tires or the two rear wheel tires of an automotive vehicle to be accurately inflated to the same pressure.

Another object of the invention is to provide a self-contained device as aforesaid whereby during the vehicle travel and quite independently of any inflating station the pressures prevailing in a pair of wheel tires, namely the two front wheel tires or the two rear wheel tires may be balanced to accurate equilibrium.

A further object of the invention is to provide a device as aforesaid whereby in the event of the pressure prevailing in any wheel tire falling to an undue extent, air from the tires of other wheels belonging to the same vehicle may be derived for reinflating at least partly the tire of that wheel which has collapsed.

A still further object of the invention is to provide a device as aforesaid including a pair of main pipes connectable to a pair of wheel tire air tubes, a primary cross pipe interconnecting said main pipes and having a pair of independently operable valves and intermediate these a connection with a source of compressed air, and a secondary cross pipe interconnecting said main pipes and having a pair of independently operable valves and intermediate these a vent fitted with a check valve.

With these and such other objects in view as will incidentally appear hereafter, the invention comprises the novel construction and combination of parts that will be described with reference to the accompanying drawing exemplifying the same and forming a part of the present disclosure.

Figure 1:
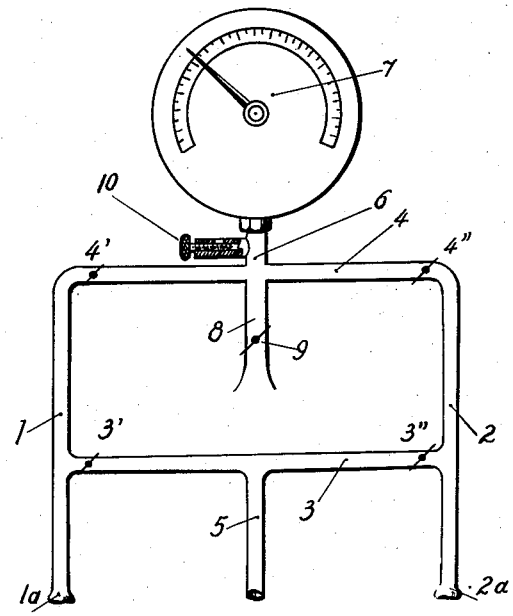
Figure 1 is a diagrammatic view showing the paths of the compressed air circuits through the several pipes of the device.
Figure 2:
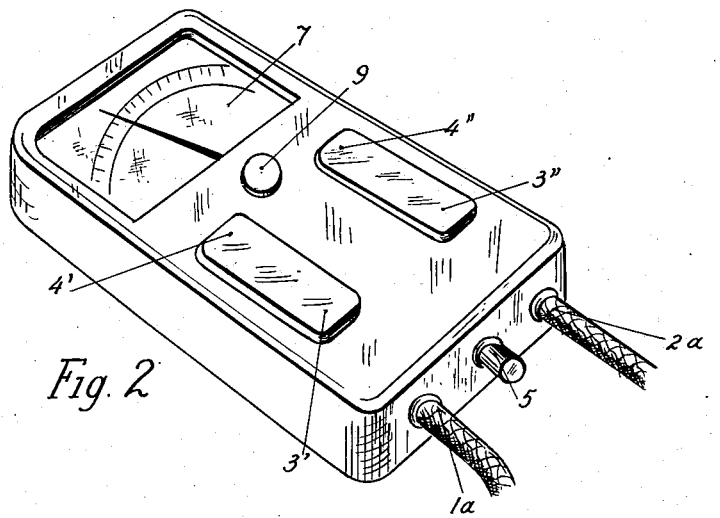
Figure 2 is a perspective view of a suitable constructional form of the device showing its compact and self-contained form.

In the showing of Fig. 1, 1 and 2 designate a pair of parallel main pipes or conduits terminating in end fittings 1a and 2a adapted to receive hoses connecting the same to the air tubes of the wheel tires (not shown). The pipes 1 and 2 are interconnected by primary and secondary cross pipes 3 and 4. Valves 3', 3", 4', 4" are provided for opening or closing (as the case may be) communication between the parallel pipes 1, 2 through the cross pipes 3, 4. The cross pipe 3 is provided at a position intermediate its two valves 3', 3" with a stub pipe 5 connectable to an inflator. The cross pipe 4 is provided likewise with a stub pipe 6 connected to a pressure gage or manometer 7. Said cross pipe 4 is also provided with a vent pipe 8 leading to the atmosphere and fitted with a normally closed and manually operable valve 9.

All valves as above stated are preferably built as manually operable valves for remaining normally closed and for becoming opened only responsive to finger pressure exerted on a set of buttons or keys as shown in Fig. 2.

Reference being now had to Fig. 2, it will be understood that at the inflating station the stub pipe 5 is tightly connected to an inflator such as an air compressor or a compressed air bottle of known type while the pipe end fittings 1a and 2a are respectively connected to a pair of wheel tires, namely to the front wheel tires or to the rear wheel tires. Assuming the valves 3', 3" to be set to opened position, inflation takes place simultaneously on both sides of the vehicle. When the valves 4', 4" have also been set to opened position, pressure checking or supervision takes place for both wheel tires. Where it is desired to cause the pressure to decrease in the wheel tires, relief valve 9 is opened.

It will be seen from the foregoing that the device permits the two wheel tires being considered to be pressure checked, inflated or deflated simultaneously. This means an important gain of time while giving the user of the device the certainty of obtaining, without special manipulations or tests in more or less groping fashion, perfect equality of pressure between the two wheel tires being thus processed. Obviously if only one wheel tire (for example the left hand side wheel tire connected to the fitting 1a) has to be attended to, the valves 3' and 4' are left open while leaving the valves 3" and 4" closed.

Once the inflation has been completed, all the valves should be allowed to come back to closed position. As the air circuit through the stub pipe 5 is then cut off, the device may be put into communication with the atmosphere.

During the vehicle travel, where it is desired to check the pressure in a wheel tire, it should be connected to the corresponding pipe fitting 1a or 2a, whereafter the associated valve 4' or 4" is opened. Where the device is connected to two wheel tires of the vehicle and the valves 4' and 4" are opened, the pressure in said tires is balanced and said pressure is readable on the dial of the gage or manometer 7 by the position of its pointer.

The pipes 1, 2 may be obviously connected to any two wheel tires of the vehicle. Thus for example during the vehicle travel, if the pressure in any wheel tire falls unduly, the possibility is afforded by successive connections with the other wheel tires to decrease the pressure in said other wheel tires or in the emergency wheel tire while increasing the pressure in the unduly soft wheel tire.

In Fig. 2 is shown in portable device including in compact form the pressure gage 7 of the dial and movable pointer type and the inner circuit pipes whose end fittings 1a, 2a and the stub pipe 5 project outside the device casing. Buttons or keys 3', 3", 4', 4" which may have any suitable shape permit the correspondingly numbered valves (see Fig. 1) to be opened responsive to depression of said buttons or keys.

In order to automatize and accelerate zeroizing of the manometer pointer and to permit quick readings to be taken from the dial, there is provided an air leak passage constituted by a properly sized port arranged in the manometer circuit. In the showing of Fig. 1, 10 designates a needle valve permitting said air leak port to be properly preset.

This refinement of the device permits the following disadvantage to be obviated where the manometer circuit is adequately tight: Assuming for example a primary reading to be taken and said reading to reveal a pressure equal to 2 kilograms, if a subsequent reading in connection with a wheel tire at a lower pressure is quickly taken, some time will elapse before the manometer pointer falls back to the efficient pressure of the other wheel tire whereas owing to this novel arrangement the pointer falls back almost instantaneously.

Minor constructional details may be altered without departing from the ambit of the invention and the scope of the subjoined claims.

What is claimed is:

1. A portable apparatus for checking and adjusting air pressure in wheel tires of automotive vehicles so as to permit balance to be achieved between a pair of wheel tires comprising in combination a pair of main pipes connectable to a pair of wheel tire air tubes, a primary cross pipe interconnecting said main pipes and having a pair of independently operable valves and intermediate said valves a connection for connecting with a source of compressed air, and a secondary cross pipe interconnecting said main pipes and having a pair of independently operable valves and intermediate the last-cited valves a vent having a normally closed and manually operable valve.

2. A portable apparatus for checking and adjusting air pressure in wheel tires of automotive vehicles so as to permit balance to be achieved between a pair of wheel tires comprising in combination a pair of main pipes connectable to a pair of wheel tire air tubes, a primary cross pipe interconnecting said main pipes and having a pair of independently operable valves and intermediate said valves a connection for connecting with a source of compressed air, and a secondary cross pipe interconnecting said main pipes and having a pair of independently operable valves and intermediate the last-cited valves a stub pipe, and a manometer connected to said stub pipe for checking the air pressure during the discharging as well as the inflating operation.

3. A portable apparatus for checking and adjusting air pressure in wheel tires of automotive and other vehicles so as to permit balance to be achieved or retrieved between a pair of wheel tires comprising in combination a pair of main pipes connectable to a pair of wheel tire air tubes, a primary cross pipe interconnecting said main pipes and having a pair of independently operable valves and intermediate said valves a connection for connecting with a source of compressed air, and a secondary cross pipe interconnecting said main pipes and having a pair of independently operable valves and intermediate the last-cited valves a vent pipe leading to the atmosphere and fitted with a normally closed and manually operable valve, said secondary cross pipe also having a stub pipe, and a manometer connected to said stub pipe for checking the air pressure during the discharging as well as the inflating operation.

4. A portable self-contained device for checking and adjusting air pressure in wheel tires of automobiles comprising a casing, a pair of main pipes arranged in said casing and having fittings projecting from said casing and connectable to a pair of wheel tire air tubes, a primary cross pipe in the casing for interconnecting said main pipes and having a pair of valves manually operable and intermediate said valves a stub pipe projecting from said casing for connection with a source of compressed air, and a secondary cross pipe also in the casing for interconnecting said main pipes at positions spaced from said primary cross pipes and having a pair of independently operable button-controlled valves and intermediate the last-cited valves a vent pipe fitted with a normally closed and manually operable valve.

5. A portable apparatus for checking and adjusting air pressure in wheel tires of automotive and other vehicles so as to permit balance to be achieved or retrieved between a pair of wheel tires, said device comprising in combination a pair of main pipes connectable to a pair of wheel tire air tubes, a primary cross pipe interconnecting said main pipes and having a pair of independently operable valves and intermediate said valves a connection for connecting with a source of compressed air, and a secondary cross pipe interconnecting said main pipes and having a pair of independently operable valves and intermediate the last-cited valves a vent pipe leading to the atmosphere and fitted with a normally closed and manually operable valve, a manometer, and a junction pipe connecting said manometer to said secondary cross pipe, said junction pipe being provided with a relief valve.

6. A device according to claim 5, wherein the last-named relief valve is a presettable needle valve for zeroing the manometer pointer.

References Cited in the file of this patent
UNITED STATES PATENTS

| | | |
|---|---|---|
| 1,576,555 | Southmayd | Mar. 16, 1926 |
| 1,710,128 | Welch | Apr. 23, 1929 |
| 2,168,690 | Uksila | Aug. 8, 1939 |
| 2,251,713 | Meiser | Aug. 5, 1941 |
| 2,427,445 | Davidson | Sept. 16, 1947 |